(12) United States Patent
Wennekamp

(10) Patent No.: US 11,479,277 B2
(45) Date of Patent: Oct. 25, 2022

(54) BOGIE FOR A RAIL VEHICLE

(71) Applicant: SIEMENS MOBILITY GMBH, Munich (DE)

(72) Inventor: Fabian Wennekamp, Essen (DE)

(73) Assignee: Siemens Mobility GmbH, Munich (DE)

(*) Notice: Subject to any disclaimer, the term of this patent is extended or adjusted under 35 U.S.C. 154(b) by 959 days.

(21) Appl. No.: 16/317,053

(22) PCT Filed: Jun. 6, 2017

(86) PCT No.: PCT/EP2017/063643
§ 371 (c)(1),
(2) Date: Jan. 11, 2019

(87) PCT Pub. No.: WO2018/010892
PCT Pub. Date: Jan. 18, 2018

(65) Prior Publication Data
US 2019/0248386 A1  Aug. 15, 2019

(30) Foreign Application Priority Data
Jul. 15, 2016 (DE) .................. 10 2016 212 938.4

(51) Int. Cl.
*B61F 15/20* (2006.01)
*G01K 13/08* (2006.01)

(52) U.S. Cl.
CPC .............. *B61F 15/20* (2013.01); *G01K 13/08* (2013.01)

(58) Field of Classification Search
CPC ......... B61F 15/20; G01K 13/08; G01M 17/08; G01M 17/10
See application file for complete search history.

(56) References Cited

U.S. PATENT DOCUMENTS

| 3,877,411 A | 4/1975 | MacDonald |
| 4,818,119 A | 4/1989 | Busch et al. |

FOREIGN PATENT DOCUMENTS

| DE | 2703071 C2 | 11/1986 | |
| DE | 4142556 A1 | 6/1993 | |
| DE | 202012003564 U1 | 4/2012 | |
| DE | 202012003564 U1 * | 6/2012 | ............... B61K 9/04 |
| EP | 3023658 A1 | 5/2016 | |
| GB | 1555141 A | 11/1979 | |
| RU | 107748 U1 | 8/2011 | |
| RU | 117381 U1 | 6/2012 | |

* cited by examiner

Primary Examiner — Robert J McCarry, Jr.
(74) Attorney, Agent, or Firm — Laurence A. Greenberg; Werner H. Stemer; Ralph E. Locher

(57) ABSTRACT

A bogie for a rail vehicle includes a wheel set with a wheel set bearing. In order to provide a cost-effective testing of a wheel set bearing temperature, the bogie includes a temperature verification or test element and a thermally conducting line which thermally connects the wheel set bearing with the temperature verification or test element. A rail vehicle having at least one bogie and a method for verifying a wheel set bearing temperature of a rail vehicle are also provided.

14 Claims, 4 Drawing Sheets

BOGIE FOR A RAIL VEHICLE

BACKGROUND OF THE INVENTION

Field of the Invention

The invention relates to a bogie for a rail vehicle having a wheel set having a wheel set bearing.

A wheel set bearing of a bogie may during travel of a rail vehicle become significantly heated under some circumstances. In technical circles, an inadmissibly significant heating of a wheel set bearing is referred to as a hot box. Since a hot box is categorized as damage which is a danger to operation, a rail vehicle in which a hot box has been determined is generally taken out of operation.

There are various reasons for the occurrence of a hot box. For example, a discharge of lubricant from the wheel set bearing which leads to an increase of friction in the wheel set bearing may bring about a hot box. Conversely, a discharge of lubricant from the wheel set bearing, for example, as a result of evaporation of the lubricant, may indicate a hot box which is already present.

In an extreme case, a breakage of a wheel set shaft and consequently a derailment of the rail vehicle may occur when a hot box occurs.

SUMMARY OF THE INVENTION

An object of the invention is to enable a verification of a wheel set bearing temperature which is low in complexity.

This object is achieved with a bogie of the type mentioned in the introduction, which according to the invention has a temperature verification element and a thermally conductive line, by means of which the wheel set bearing is thermally connected to the temperature verification element.

The invention is based on the consideration that temperatures of wheel set bearings can be monitored in principle by means of vehicle-side and/or track-side monitoring systems. Since such monitoring systems may be defective, it is advantageous for the plausibility of a hot box notification of such a monitoring system to be able to be manually validated after the rail vehicle has been stopped, for example, by means of a vehicle driver.

As a result of the thermally conductive line, the wheel set bearing and the temperature verification element are connected to each other in such a manner that heat is transmitted from one of these two elements to the other of the two elements. Typically, the heat is transmitted from the wheel set bearing to the temperature verification element since the wheel set bearing becomes heated during travel of the rail vehicle. Advantageously, the thermally conductive line produces a thermal equilibrium between the wheel set bearing and the temperature verification element so that the wheel set bearing and the temperature verification element have the same temperatures.

The temperature verification element may be positioned at a readily accessible location, so that—as a result of a verification of a temperature of the temperature verification element—a temperature of the wheel set bearing can be verified from a readily accessible location. Consequently, the verification of the wheel set bearing temperature can be carried out with little complexity.

In the case of a bogie which is supported internally, it is particularly unnecessary for a vehicle driver or another person to have to lie underneath the bogie in order to be able to measure by means of a thermometer the temperature of the wheel set bearing which in the case of a bogie which is supported internally is normally covered by a wheel disk of the wheel set.

Furthermore, the temperature verification element can be used for an automated control of the temperature of the wheel set bearing.

A temperature verification element may be understood to be an element which—where applicable in cooperation with other elements—serves by means of a verification of the temperature thereof to verify a temperature of the wheel set bearing.

The verification of a temperature may involve establishing the temperature and/or determining whether the temperature has exceeded a predetermined temperature threshold value.

The thermally conductive line advantageously has a thermally conductive material. The thermally conductive material may, for example, be a pure substance or a material admixture, in particular a metal alloy.

In this instance, a component or a material may be understood to be thermally conductive if it has a thermal conductivity of at least 10 W/(m.K). Preferably, the thermally conductive line has a thermal conductivity of at least 50 W/(m.K), in a particularly preferred manner of at least 200 W/(m.K).

The thermally conductive line may have a solid body, in particular a metal solid body, or a liquid as a thermally conductive material. For example, copper, aluminum and/or silver may be provided as a thermally conductive material.

Advantageously, the thermally conductive line is at least partially thermally insulated. That is to say, the thermally conductive line is advantageously at least partially surrounded by a thermally insulating material. In this manner, heat losses to the environment of the thermally conductive line may be prevented or at least reduced.

Furthermore, it is advantageous for the thermally conductive line to be secured to a frame of the bogie. Preferably, the thermally conductive line is insulated with respect to the frame of the bogie. It is particularly preferable for the thermally conductive line between the temperature verification element and the wheel set bearing to be surrounded by a thermally insulating material.

It is further advantageous for the temperature verification element to be at least partially thermally insulated with respect to the frame of the bogie.

Advantageously, the wheel set comprises two wheel disks. Preferably, the said wheel set bearing of the bogie is arranged between the two wheel disks. Therefore, the bogie is preferably an internally supported bogie, also referred to as a bogie with an internal bearing.

Alternatively, the bogie may be constructed as an externally supported bogie, also referred to as a bogie with an external bearing.

In an advantageous embodiment of the invention, the temperature verification element is constructed as a thermally conductive member or the temperature verification element comprises a thermally conductive member. Advantageously, the thermally conductive member is a metal member. The thermally conductive member may, for example, be constructed as a plate. Preferably, the thermally conductive member has a thermal conductivity of at least 50 W/(m.K), in a particularly preferred manner of at least 200 W/(m.K).

It is further preferable for the thermally conductive member to comprise a thermally conductive measurement face, in particular for a temperature measurement by means of a thermometer. Furthermore, the thermally conductive member may be secured to the bogie frame.

In an advantageous development of the invention, there is provision for the temperature verification element to comprise an indication means, in particular an optical indication means. The indication means is advantageously configured to signal whether a temperature of the temperature verification element has exceeded a predetermined temperature threshold value. Since the temperature verification element and the wheel set bearing are in thermal contact with each other, it is possible with reference to this information to establish whether the temperature of the wheel set bearing has exceeded the predetermined temperature threshold value.

It is possible to provide as an indication means, for example, a thermal paint which is configured to discolor when the temperature of the temperature verification element exceeds the predetermined temperature threshold value.

In principle, it is possible for the thermal paint to discolor in a reversible manner when the temperature of the temperature verification element exceeds the predetermined temperature threshold value.

It is particularly preferable for the thermal paint to discolor in a reversible manner when the temperature of the temperature verification element exceeds the predetermined temperature threshold value. That is to say, the thermal paint preferably retains its color which it has assumed after exceeding the temperature threshold value even when the temperature of the temperature verification element falls below this value again after the temperature threshold value has been exceeded.

Furthermore, there may be provided as an indication means at least one paint capsule which is configured to burst when the temperature of the temperature verification element exceeds the predetermined temperature threshold value. The paint capsule may, for example, be filled with a liquid and/or with powder. As a result of the bursting of the capsule, the above-mentioned thermally conductive member, in particular the measurement face thereof, may be at least partially discolored.

Furthermore, there may be provided as an indication means an illumination device which is configured to illuminate when the temperature of the temperature verification element exceeds the predetermined temperature threshold value. Preferably, the illumination device remains illuminated after a value has exceeded the temperature threshold value and where applicable fallen below it again.

There may further be provided as an indication means a display device which comprises a bi-metal member and which is configured with reference to a temperature-related deformation of the bi-metal member to indicate whether the temperature of the temperature verification element has exceeded the predetermined temperature threshold value.

In principle, the temperature verification element may comprise a plurality of indication means, in particular a combination of the above-mentioned embodiments of indication means.

In a preferred embodiment of the invention, the bogie has an additional wheel set. Advantageously, the temperature verification element is arranged between a first plane which extends perpendicularly to a longitudinal direction of the bogie through the first wheel set mentioned, and a second plane which extends perpendicularly to the longitudinal direction of the bogie through the additional wheel set.

Preferably, the bogie comprises an additional temperature verification element. Furthermore, it is advantageous for the bogie to have an additional thermally conductive line, by means of which an additional wheel set bearing of the wheel set is thermally connected to the additional temperature verification element.

The first temperature verification element mentioned and the additional temperature verification element may, for example, be positioned at mutually opposite sides of the bogie.

There may be provision for the bogie to have an additional temperature verification element and an additional thermally conductive line, by means of which an additional wheel set bearing of the wheel set is thermally connected to the additional temperature verification element.

The first temperature verification element mentioned and the additional temperature verification element may, for example, be positioned at the same side of the bogie.

The bogie may in particular be a so-called clad bogie. That is to say, the bogie may have a cladding which at least partially surrounds the bogie frame thereof and the wheel set. In such a case, the temperature verification element may advantageously be arranged at an outer side of the cladding. This enables good accessibility to the temperature verification element.

The outer side of the cladding may in this instance be understood to be the side of the cladding facing away from the bogie frame. The cladding of the bogie may, for example, serve to decrease the air resistance of the bogie.

In a preferred embodiment of the invention, the bogie has for each of the wheel set bearings thereof a separate temperature verification element. Furthermore, it is preferable for the bogie to have a separate thermally conductive line for each of the wheel set bearings thereof. Advantageously, as a result of the respective thermally conductive line, precisely one of the wheel set bearings is thermally connected to precisely one of the temperature verification elements.

The temperature verification elements may, for example, all be positioned at the same side of the bogie. Alternatively, some of the temperature verification elements may be positioned at a first side of the bogie, whilst the remaining temperature verification elements can be positioned at a second side of the bogie opposite the first side.

In an advantageous development of the invention, the temperature verification element has a portion which has a greater spacing with respect to a longitudinal center plane of the bogie than a wheel disk of the wheel set. It is thereby possible for a track-side hot box location system to be able to be used to verify the temperature of the temperature verification element.

A longitudinal center plane of the bogie may be understood in this instance to be a plane which extends parallel with the longitudinal direction of the bogie through the center point thereof. Advantageously, the longitudinal center plane of the bogie is orientated perpendicularly to a wheel set shaft of the wheel set.

Furthermore, the invention relates to a rail vehicle which has at least one bogie according to the above description.

Furthermore, the invention relates to a method for verifying a wheel set bearing temperature of a rail vehicle.

The method according to the invention makes provision for the rail vehicle to have a bogie having a wheel set, a thermally conductive line and a temperature verification element, a wheel set bearing of the wheel set to be thermally connected by the thermally conductive line to the temperature verification element, heat from the wheel set bearing to be directed via the thermally conductive line to the temperature verification element and a temperature of the temperature verification element to be verified.

The wheel set bearing temperature can in turn be verified with reference to the temperature of the temperature verification element which advantageously corresponds to the wheel set bearing temperature.

The bogie which is mentioned in connection with the method is advantageously the bogie according to the invention, in particular one of the above-described advantageous developments of the bogie according to the invention.

An advantageous development of the invention makes provision for an indication means, in particular an optical indication means, of the temperature verification element to signal whether the temperature of the temperature verification element has exceeded a predetermined temperature threshold value.

During a stoppage of the rail vehicle, the temperature of the temperature verification element can be established by means of a thermometer.

For example, the thermometer may be retained on a thermally conductive measurement face, in particular on a metal measurement face, of the temperature verification element in order to establish the temperature of the temperature verification element.

If the thermometer is a thermometer which measures in a contactless manner, the thermal radiation emitted from the measurement face of the temperature verification element can be measured by means of the thermometer. Using the detected thermal radiation, the temperature of the temperature verification element can be established by the thermometer.

In previously known bogies, the verification of the wheel set bearing temperature is possible using track-side-mounted hot box location systems only with externally supported bogies since hot box location systems are located outside the rails when viewed from the track center. The temperature verification element enables in contrast a verification of the wheel set bearing temperature independently of the bogie type—that is to say, regardless of whether the bogie is an externally supported bogie or an internally supported bogie.

There may thus, for example, be provision during travel of the rail vehicle for the temperature of the temperature verification element to be established by means of a hot box location system. The hot box location system can detect the thermal radiation emitted from the temperature verification element, in particular from the measurement face thereof, and can, using the thermal radiation detected, establish the temperature of the temperature verification element.

The description set out above of advantageous embodiments of the invention contains numerous features which are reproduced in the individual dependent claims, sometimes combined together. However, these features may also advantageously be considered individually and combined to form advantageous additional combinations. In particular, these features can be combined individually and in any desired appropriate combination with the bogie according to the invention and the method according to the invention. Thus, method features are also intended to be considered to be a property of the corresponding device unit and vice versa.

Even when, in the description or in the claims, some terms are used in the singular or together with a numeral, the scope of the invention for these terms is not intended to be limited to the singular or the respective numeral.

The above-described properties, features and advantages of the invention and the manner in which they are achieved will become clearer and more readily understood in connection with the following description of the embodiments of the invention which are explained in greater detail in connection with the drawings. The embodiments serve to explain the invention and do not limit the invention to the combinations of features set out therein, including not with respect to functional features. Furthermore, features of each embodiment which are appropriate for this purpose can also be considered explicitly in isolation, removed from an embodiment, introduced into another embodiment in order to supplement it and combined with any of the claims.

BRIEF DESCRIPTION OF THE SEVERAL VIEWS OF THE DRAWING

FIG. 1 is a schematic illustration of a rail vehicle 2.

DESCRIPTION OF THE INVENTION

Figure 1:
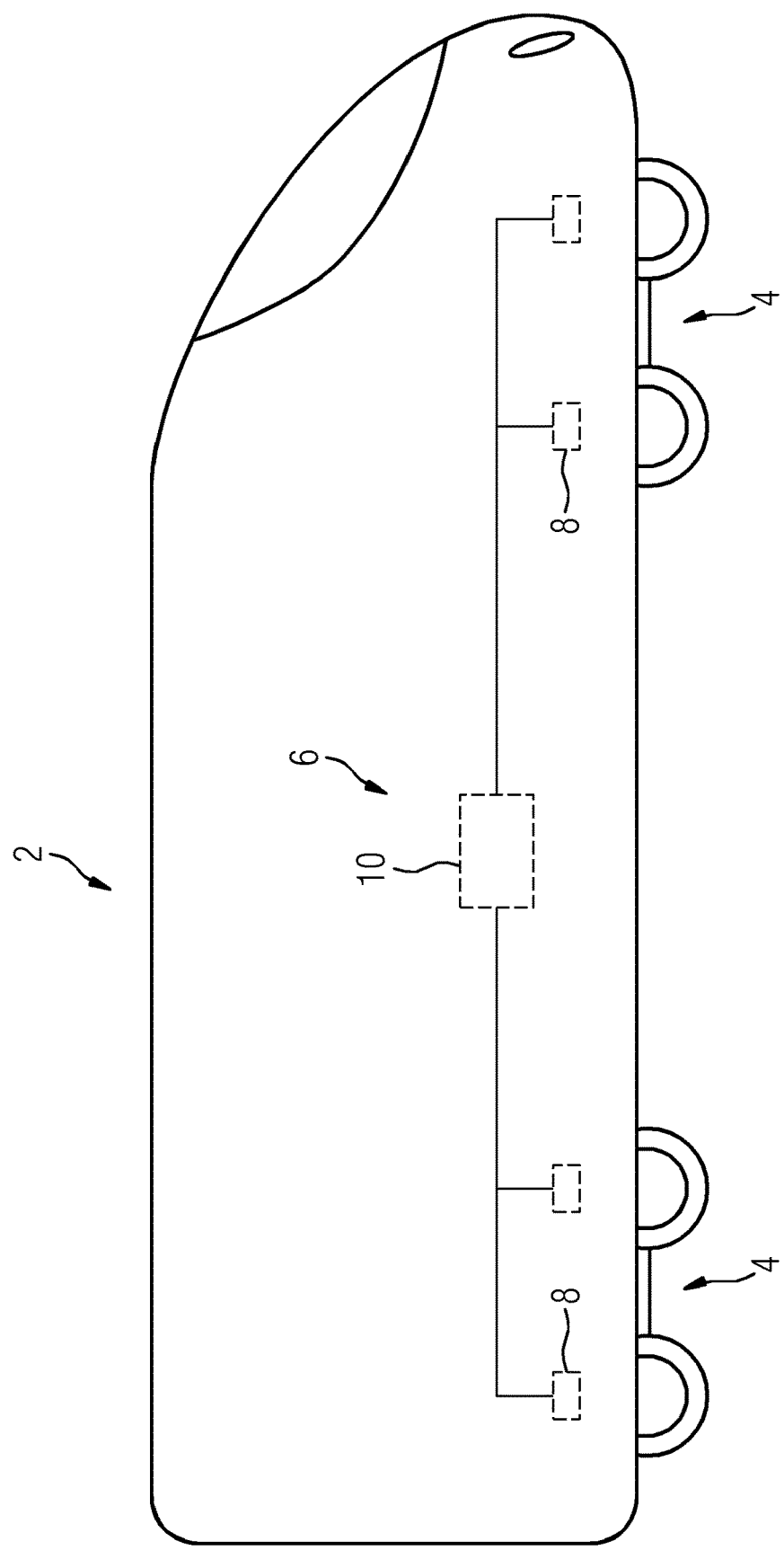
FIG. 1 is a schematic illustration of a rail vehicle with two bogies.

The rail vehicle 2 has two bogies 4 which are constructed at least substantially identically. Furthermore, the rail vehicle 2 comprises a monitoring system 6 with a plurality of temperature sensors 8 and an evaluation unit 10 which is connected so as to communicate with the temperature sensors 8 for evaluating temperature signals which are produced by the temperature sensors 8.

Figure 2:
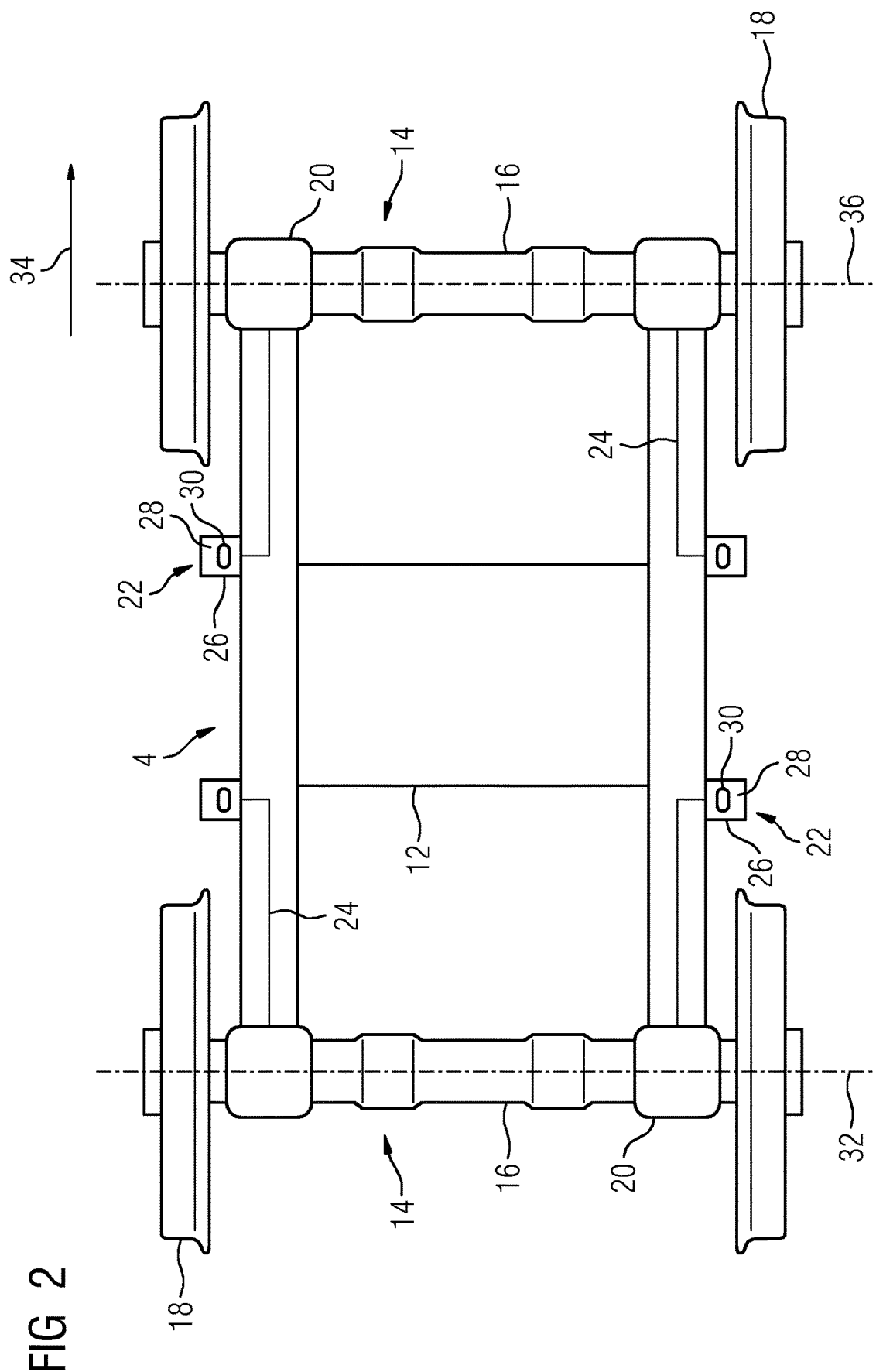
FIG. 2 is a plan view of one of the two bogies from FIG. 1.

FIG. 2 shows by way of example one of the two bogies 4 of the rail vehicle 2 from FIG. 1 as a plan view.

The bogie 4 has a frame 12 and two wheel sets 14 which are constructed in an identical manner. Each of the two wheel sets 14 comprises a wheel set shaft 16 and two wheel disks 18 which are connected to the wheel set shaft 16. Furthermore, each of the two wheel sets 14 has two wheel set bearings 20, by means of which the wheel set shaft 16 of the respective wheel set 14 is supported on the frame 12.

In the present case, the bogie 4 is a so-called internally supported bogie. That is to say, the wheel set bearings 20 of the respective wheel set 14 are arranged between the wheel disks 18 thereof.

Furthermore, the bogie 4 has four temperature verification elements 22. Furthermore, the bogie 4 comprises four thermally conductive lines 24 which have copper as the thermally conductive material. Each of the thermally conductive lines 24 connects precisely one of the wheel set bearings 20 thermally to precisely one of the temperature verification elements 22.

Both the temperature verification elements 22 and the thermally conductive lines 24 are secured to the frame 12 of the bogie 4. Furthermore, the thermally conductive lines 24 are thermally insulated with respect to the frame 12. The temperature verification elements 22 are thermally insulated with respect to the frame 12 at the respective securing location thereof, at which the respective temperature verification element 22 is secured to the frame 12.

Each of the temperature verification elements 22 has a thermally conductive, plate-like member 26 of metal, in particular of copper, having a thermally conductive measurement face 28. In the present embodiment, each of the temperature verification elements 22 additionally has a paint capsule 30 which is filled with a liquid as an optical indication means which is fitted to the metal member 26 of the respective temperature verification element 22.

Furthermore, the temperature verification elements 22 are each arranged between a first plane 32, which extends perpendicularly to a longitudinal direction 34 of the bogie 4 through one of the two wheel sets 14, and a second plane 36 which extends perpendicularly to the longitudinal direction 34 of the bogie 4 through the other of the two wheel sets 14.

Furthermore, the temperature verification elements 22 are in the present embodiment positioned at two different mutually opposing sides of the bogie 4.

The monitoring system 6 of the rail vehicle 2 establishes by means of the temperature sensors 8 thereof the temperature which the respective wheel set bearing 20 has.

If the temperature of one of the wheel set bearings 20 exceeds a predetermined temperature threshold, the monitoring system 6 produces a hot box notification which is transmitted to a vehicle driver via an output device (not illustrated in the Figures) of the rail vehicle 2 and which comprises an identifier which can be clearly associated with the wheel set bearing 20 affected. In such a case, the rail vehicle 2 is brought promptly to a standstill.

When the rail vehicle 2 comes to a standstill, the vehicle driver goes to the affected wheel set bearing 20 in order to verify the plausibility of the hot box notification. To this end, the vehicle driver establishes by means of a mobile thermometer (not illustrated in the drawings) the temperature of the temperature verification element 22 which is thermally connected via one of the thermally conductive lines 24 to the affected wheel set bearing 20.

Since, via the said thermally conductive line 24, heat is transmitted from the affected wheel set bearing 20 to the temperature verification element 22 which is thermally connected to the wheel set bearing 20, there is a thermal equilibrium between the wheel set bearing 20 and the temperature verification element 22 so that these two elements have the same temperature. As a result of the measurement of the temperature of the temperature verification element 22, the vehicle driver can thus establish the temperature of the wheel set bearing 20 from a readily accessible location.

The thermometer used by the vehicle driver may, for example, be a thermometer which measures in a contactless manner, in particular a pyrometer which establishes the thermal radiation radiated from the measurement face 28 of the said temperature verification element 22 and establishes therefrom the temperature thereof.

The thermometer may emit a laser beam in order to detect the target surface. Furthermore, the thermometer may have a light source for illuminating the temperature verification element 22.

The above-mentioned paint capsules 30 are configured to burst when the temperature of the respective temperature verification element 22 exceeds the predetermined temperature threshold value. The bursting of the paint capsule 30 of one of the temperature verification elements 22 leads to a coloring of a portion of the thermally conductive member 26 of the temperature verification element 22. The vehicle driver can thereby also determine purely by means of a visual inspection whether the temperature of the temperature verification element 22 and consequently also the temperature of the associated wheel set bearing 20 has exceeded the predetermined temperature threshold value.

The descriptions of the following embodiments are limited in each case primarily to the differences with respect to the previous embodiment to which reference will be made with respect to features and functions which remain the same. Elements which are substantially identical or which correspond to each other are, as long as it is advantageous, indicated with the same reference numerals and features which are not mentioned are taken up in the following embodiments without being described again.

Figure 3:
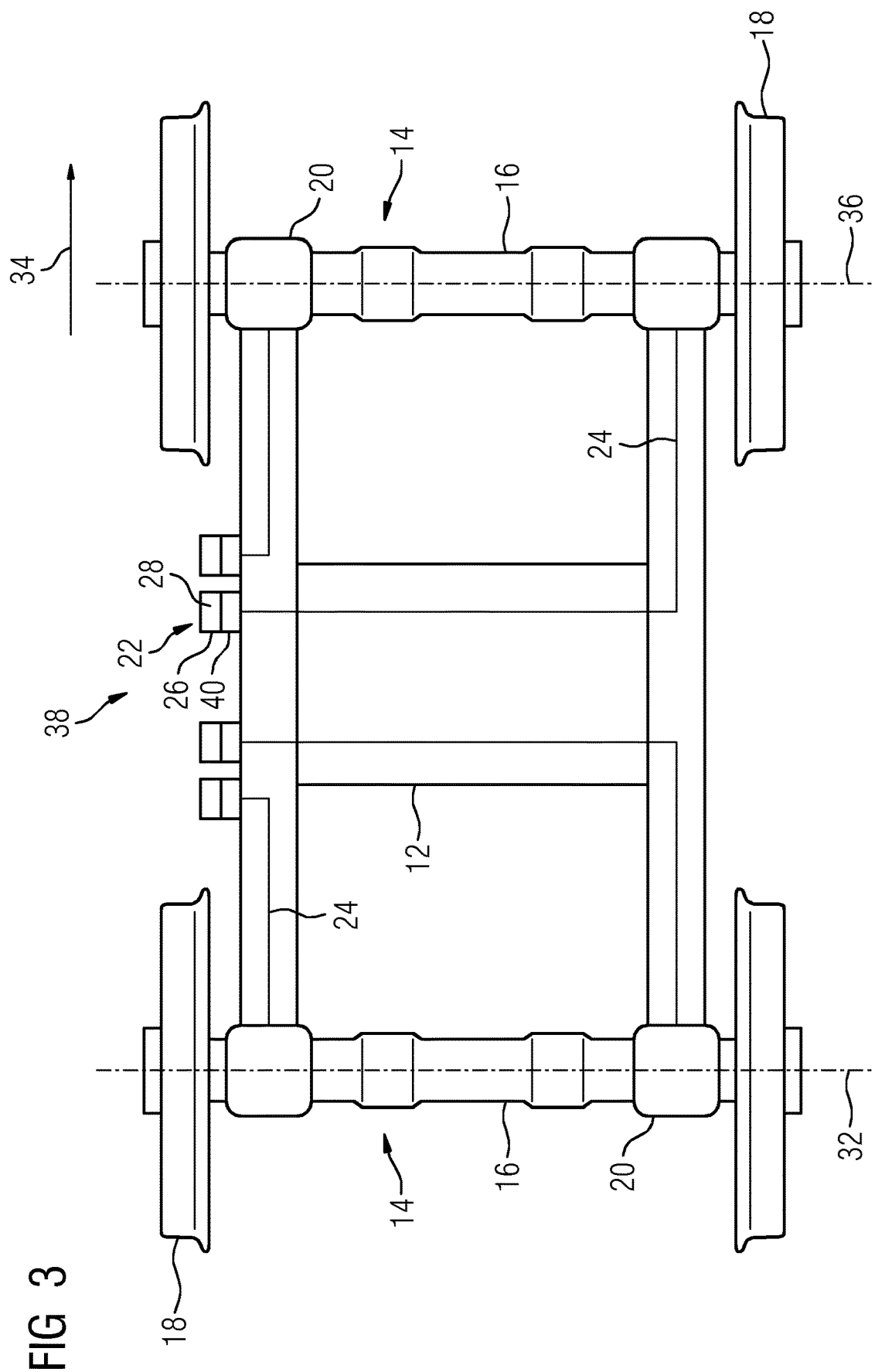
FIG. 3 is a plan view of an alternative bogie.

FIG. 3 is a plan view of an alternative bogie 38. This bogie 38 may, for example, be used in place of the bogie 4 from FIG. 2 in the rail vehicle 2.

In the present embodiment, the temperature verification elements 22 are all arranged at the same side of the bogie 38. The vehicle driver can thereby verify the temperatures of all the wheel set bearings 30 from one side of the bogie 38 without having to move around the rail vehicle 2 to the other side of the bogie 38.

Furthermore, the temperature verification elements 22 each have in place of a paint capsule a thermal paint 40 as an optical indication means.

If the temperature of one of the temperature verification elements 22 exceeds the predetermined temperature threshold value, the thermal paint 40 thereof is discolored in an irreversible manner and thereby visually signals that the temperature threshold value has been exceeded.

Figure 4:
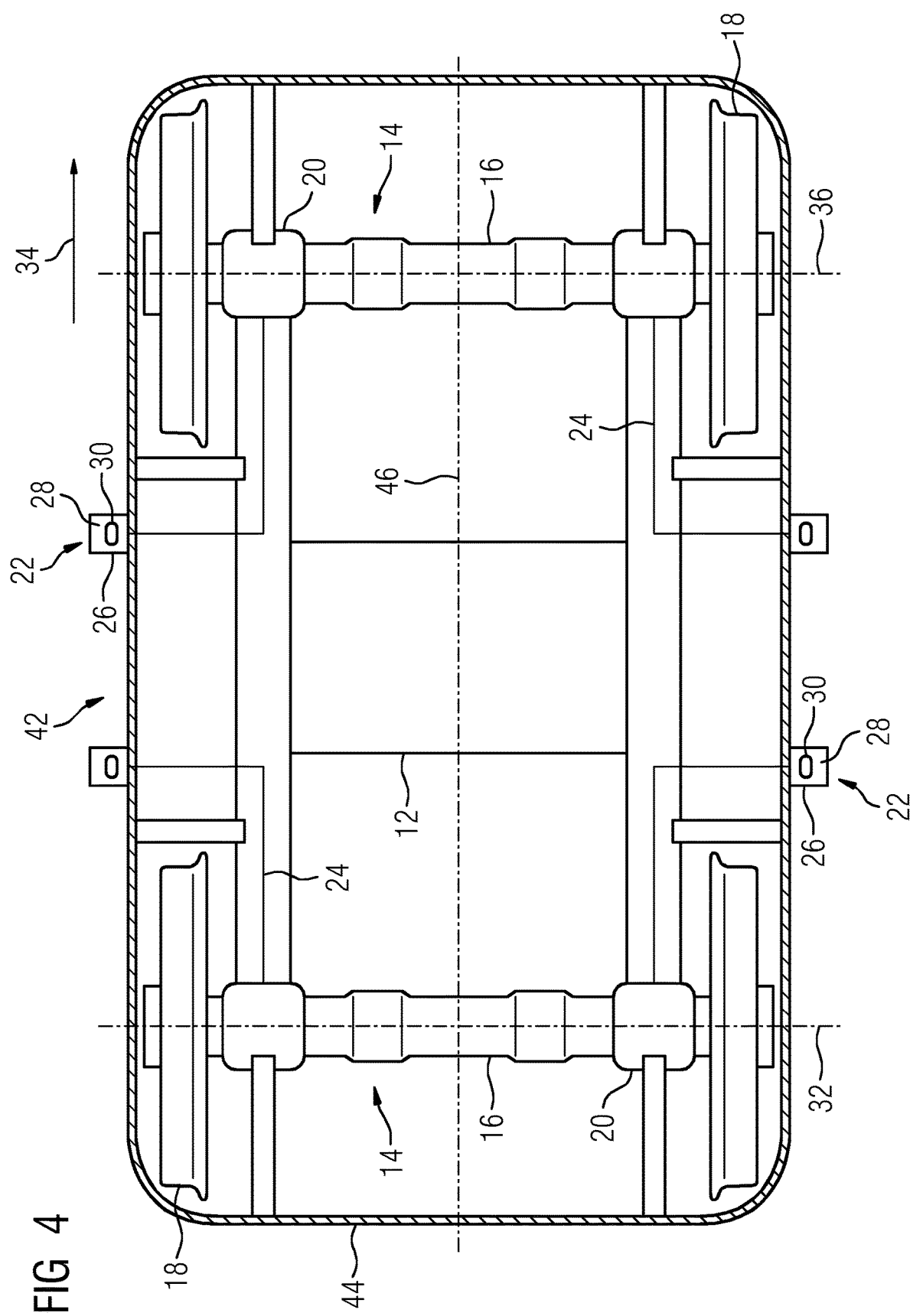
FIG. 4 is a plan view of yet another alternative bogie.

FIG. 4 is a plan view of yet another alternative bogie 42. This bogie 42 may, for example, be used in place of the bogie 4 from FIG. 2 or the bogie 38 from FIG. 3 in the rail vehicle 2.

In the present embodiment, the bogie 42 has a cladding 44 which surrounds the frame 12 and the wheel sets 14, wherein the cladding 44 is depicted as a sectioned illustration.

The temperature verification elements 22 of this bogie 42 are secured to an outer side of the cladding 44. In addition, the temperature verification elements 22 are thermally insulated with respect to the cladding 44 at the respective securing location thereof, at which the respective temperature verification element 22 is secured to the cladding 44.

Furthermore, the temperature verification elements 22 each have a larger spacing with respect to a longitudinal center plane 46 of the bogie 42 than the wheel disks 18 of the wheel sets 14.

During travel of the rail vehicle 2, track-side hot box location systems (not illustrated in the drawings) which are located outside the rails when viewed from the track center, can be used in order to establish the temperatures of the temperature verification elements 22 and thereby to verify the temperatures of the wheel set bearings 20.

The use of track-side hot box location systems for monitoring the wheel set bearing temperatures is not limited to a bogie with a cladding—for example, as illustrated in FIG. 4. With the bogie 4 from FIG. 2 or the bogie 38 from FIG. 3, such a monitoring is also possible by means of track-side hot box locations systems if the temperature verification elements 22 are constructed to be sufficiently long and/or have a sufficiently large spacing with respect to the longitudinal center plane 46 of the respective bogie 4, 38 so that the thermal radiation emitted from the temperature verification elements 22 can be detected by the hot box location systems.

Although the invention has been illustrated and described in greater detail by the preferred embodiments, the invention is not limited by the disclosed examples and other variations can be derived therefrom without departing from the protective scope of the invention.

The invention claimed is:

1. A bogie for a rail vehicle, the bogie comprising:
    a wheel set having a wheel set bearing;
    a temperature verification element:
        said temperature verification element being a thermally conductive member with a thermally conductive measurement face, or
        said temperature verification element including a thermally conductive member with a thermally conductive measurement face; and a thermally conductive line thermally connecting said wheel set bearing to said temperature verification element.

2. The bogie according to claim 1, wherein said thermally conductive line is at least partially thermally insulated.

3. The bogie according to claim 1, wherein said wheel set includes two wheel disks, and said wheel set bearing is disposed between said two wheel disks.

4. The bogie according to claim 1, wherein said temperature verification element includes an indicator configured to signal whether or not a temperature of said temperature verification element has exceeded a predetermined temperature threshold value.

5. The bogie according to claim 4, wherein:
said indicator is a thermal paint configured to discolor when the temperature of said temperature verification element exceeds the predetermined temperature threshold value, or
said indicator includes at least one paint capsule configured to burst when the temperature of said temperature verification element exceeds the predetermined temperature threshold value.

6. The bogie according to claim 1, wherein:
said wheel set is a first wheel set defining a first plane extending perpendicularly to a longitudinal direction of the bogie through said first wheel set;
a second wheel set defines a second plane extending perpendicularly to the longitudinal direction of the bogie through said second wheel set; and
said temperature verification element is disposed between said first plane and said second plane.

7. The bogie according to claim 1, wherein:
said wheel set bearing is a first wheel set bearing of first and second wheel set bearings;
said temperature verification element is a first temperature verification element of first and second temperature verification elements;
said thermally conductive line is a first thermally conductive line of first and second thermally conductive lines;
said second thermally conductive line thermally connects said second wheel set bearing to said second temperature verification element; and
said first temperature verification element and said second temperature verification element are positioned at mutually opposite sides of the bogie.

8. The bogie according to claim 1, wherein:
said wheel set bearing is a first wheel set bearing of first and second wheel set bearings;
said temperature verification element is a first temperature verification element of first and second temperature verification elements;
said thermally conductive line is a first thermally conductive line of first and second thermally conductive lines;
said second thermally conductive line thermally connects said second wheel set bearing to said second temperature verification element; and
said first temperature verification element and said second temperature verification element are positioned at an identical side of the bogie.

9. The bogie according to claim 1, which further comprises a bogie frame and a cladding at least partially surrounding said bogie frame and said wheel set, said temperature verification element being disposed at an outer side of said cladding.

10. The bogie according to claim 1, wherein:
said wheel set has a wheel disk; and
said temperature verification element has a portion being disposed further from a longitudinal center plane of the bogie than said wheel disk.

11. A rail vehicle, comprising at least one bogie according to claim 1.

12. A method for verifying a wheel set bearing temperature of a rail vehicle, the method comprising the following steps:
providing the rail vehicle with a bogie including a wheel set having a wheel set bearing, a thermally conductive line and a temperature verification element;
thermally connecting the thermally conductive line from the wheel set bearing to the temperature verification element;
directing heat from the wheel set bearing through the thermally conductive line to the temperature verification element; and
verifying a temperature of the temperature verification element.

13. The method according to claim 12, which further comprises using a thermometer to establish the temperature of the temperature verification element during a stoppage of the rail vehicle.

14. The method according to claim 13, which further comprises using a hot box location system to establish the temperature of the temperature verification element during travel of the rail vehicle.

* * * * *